United States Patent Office 2,745,834
Patented May 15, 1956

2,745,834

STABILIZATION OF CERTAIN VINYL-PYRIDINES, VINYL QUINOLINES AND VINYL-ISOQUINOLINES

Clyde W. Mertz, Borger, Tex., assignor to Phillips Petroleum Company, a corporation of Delaware No Drawing. Application February 9, 1953,
Serial No. 336,010

12 Claims. (Cl. 260—290)

This invention pertains to the stabilization of vinyl-substituted heterocyclic nitrogen compounds. In one of its aspects the invention pertains to the purification of vinylpyridine compounds. In another of its aspects the invention relates to stabilization during purification of alkyl-substituted vinylpyridine.

It is known that difficulties are encountered in the manufacture of vinylpyridine compounds because of the tendency of these heterocyclic nitrogen compounds to polymerize upon exposure to elevated temperatures. For example, difficulty is generally encountered in purifying vinylpyridine compounds by distillation due to their susceptibility to polymerization, which results in the formation of an insoluble polymer within the column. In order to overcome this difficulty it is necessary to operate at low temperatures under high vacuum, or in some way stabilize these pyridines against polymerization during distillation.

In accordance with an aspect of this invention it is proposed to add a novel inhibiting agent or stabilizer and carry out a fractional distillation of a mixture of organic compounds, containing a substantial proportion of at least one vinyl-substituted heterocyclic nitrogen compound, in the presence of this stabilizer to inhibit or prevent polymer formation. I have found that, if an inorganic polysulfide of the type disclosed herein is present during distillation, polymer formation is thereby inhibited. The inorganic polysulfide is used to inhibit polymerization while closely boiling compounds are distilled to remove one or more vinyl-substituted heterocyclic nitrogen compounds. By further treatment, the inorganic polysulfide can be removed if desired. Thus, in the practice of an embodiment of this invention a continuous process is provided for inhibiting the formation of insoluble polymer in a fractionation zone in which vinylpyridine compounds are being distilled. The separation of vinylpyridine compounds from a mixture is effected in the presence of an inorganic polysulfide of the type disclosed herein.

The polymerization which is inhibited by the novel stabilizing agents disclosed herein is primarily that which forms an insoluble, hard, porous, opaque material often referred to as popcorn polymer. However, polymers are also formed which are soluble in the vinylpyridine reactants and which become apparent by an increase in viscosity of the vinylpyridine reactants. As will be seen from the accompanying examples, soluble polymer formation is also inhibited by the disclosed stabilizing agents, but to a lesser extent than is popcorn polymer formation inhibited.

Inorganic polysulfides employed in accordance with this invention are the alkali-metal polysulfides whose general formula is $A_2S_x$, wherein A represents sodium, potassium, caesium, rubidium or lithium and $x$ is an integer from 2 to 5 representing the number of sulfur atoms. I prefer sodium polysulfide but the polysulfides of potassium also are desirable, and the customary polysulfides of these alkali-metals, which are a mixture of sulfides with from 2 to 5 sulfur atoms, are satisfactory.

The process of this invention is applicable to organic heterocyclic mixtures containing a substantial proportion of vinyl-substituted heterocyclic nitrogen compounds, i. e. that amount which causes difficulty during distillation, e. g., from 70 per cent to 99 per cent by weight of vinyl compound. However, whenever a mixture containing a major, and sometimes a lesser, amount of a vinyl-substituted heterocyclic nitrogen compound is distilled it is desirable to employ the inhibitor of this invention. Preferred polymerizable heterocyclic nitrogen compounds which can be stabilized in accordance with my invention are the mono- and di- vinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferably methyl and ethyl groups. Substituents to be attached to carbon atoms in the pyridine ring can be selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethylpyridine; 2,3,4, tri-methyl-5-vinylpyridine; 3,4,5,6,-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinyl-pyridine; 3-dodecyl-4,5-divinylpyridine; 2,4-dimethyl-5,6-dipentyl-3-vinylpyridine; 2-decyl-5-(alpha-methylvinyl) pyridines; 3,5-di (alpha-methylvinyl) pyridine; and the like.

Those skilled in the art will appreciate that for the purpose of this invention compounds of the above nature substituted with non-interfering groups, for example halo, nitro, amino-, hydroxyl-, and carboxyl-, are the same as those compounds listed.

Other polymerizable heterocyclic nitrogen compounds within the scope of this invention include those vinyl and alpha-methylvinyl substituted heterocyclic nitrogen compounds in which the ring structure is unsaturated, partially saturated and completely saturated. Examples include vinyl and alpha-methylvinyl substituted quinolines, isoquinolines, piperidines (hexa-hydropyridines), pyrroles, pyrrolidines, pyrrolidones, especially the vinyl-substituted pyrrolidones, piperidines, pyrroles, pyrrolidines, quinolines, isoquinolines, and alkyl derivatives of the foregoing compounds, dihydro and tetrahydro-pyridines, partially hydrogenated quinolines and isoquinolines, and pyrrolines (dihydropyrroles). Examples of such compounds are 2-vinylquinolines; 8-ethyl-2-vinylquinoline; 4-hexyl-5-vinyl-quinoline; 1-vinylisoquinoline; 5-methyl-1-isopropenyliso-quinoline; 1,8-divinylisoquinoline; and the like. Normally the vinyl substituent will be attached to a ring carbon atom. However, in compounds containing a secondary ring nitrogen atom, the vinyl group can instead be attached to this ring nitrogen atom, for example in N-vinyl-carbazole and N-vinylpyrrolidone.

As indicated, the process of this invention is applicable to mixtures of heterocyclic nitrogen compounds containing a substantial proportion of a vinylpyridine compound. By a vinylpyridine compound I mean vinylpyridine and vinylpyridines having other substituents as mentioned hereinbefore, particularly 2-vinyl-4,6-dimethylpyridine, 2-methyl-4-vinylpyridine, 2-methyl-5-vinylpyridine, 5-ethyl-2-vinylpyridine. These compounds can be prepared by dehydrogenation. Long chain alkyl vinylpyridines, on the other hand, can be prepared by treating alkyl-pyridines, having a methyl group in the 2 or 4 position, i. e., a reactive methyl group, with formaldehyde so that formaldehyde and the methyl group combine, and then splitting off a molecule of water to form the vinyl group.

In the preparation of 2-methyl-5-vinylpyridine by the catalytic dehydrogenation of 2-methyl-5-ethylpyridine the effluent gases containing steam and organic materials can be cooled to liquid phase by direct contact with cooling water in a liquid-liquid condenser. Since polymerization of vinylpyridines is promoted by elevated temperatures it is advisable that an inhibitor be present in said cooling water. Also, upon separation of said cooling water and organic materials in a separator tank the organic-containing water phase is passed to an organic material recovery system in which polymerization of vinylpyridines must be prevented. Accordingly it will be found desirable to employ the inhibitors of this invention by injection into said cooling water used to condense the effluent gases from said dehydrogenation reactions.

In the preparation of 2-methyl-5-vinylpyridine from 2-methyl-5-ethyl-pyridine by dehydrogenation the principal separation is a combined steam and vacuum distillation to make a separation between 2-methyl-5-ethylpyridine and 2-methyl-5-vinylpyridine. This separation is difficult because of the rapid polymerization of 2-methyl-5-vinylpyridine. After a short period of time operation of the column becomes impossible because of an insoluble polymer which forms in the lower part of the fractionating column and in the kettle. However, by the use of polysulfides in accordance with this invention, shutdowns due to the formation of insoluble polymer are largely eliminated. I have found that, when the object is merely to stabilize the distillate by the inhibition of insoluble polymer formation, the polysulfide can be employed in the lowest proportion which will desirably inhibit the formation of insoluble polymer. For such purpose the feed or the reflux to the distillation column is preferably treated with from 0.1 to 0.5 per cent by weight of the inorganic polysulfide based on the vinyl-substituted heterocyclic nitrogen compound. In many instances, when the concentration of the polysulfide utilized is greater than 0.5 per cent by weight based on the vinyl-substituted heterocyclic nitrogen compound, say 0.5 to 5 per cent by weight, the formation of soluble polymer is inhibited during distillation as well as the formation of insoluble polymer.

In practicing the invention, for example in the separation of 2-methyl-5-vinylpyridine from 2-methyl-5-ethylpyridine and lighter material, the mixture can be distilled in a combined steam-vacuum unit operated with a top tower pressure of 100 millimeters mercury absolute. Sufficient steam is added to the unit to maintain a temperature of 185° F. in the reboiler. The 2-methyl-5-vinylpyridine and the polysulfide are withdrawn at the bottom of the unit. These can be stored or the polysulfide removed if desired and then the product stored.

One method of operation is to take the vinylpyridine product from storage and subject it to a final fractionation to recover at least 95 per cent pure methylvinylpyridine as overhead product. In this column insoluble polymer formation has been particularly troublesome prior to the use of this invention.

The following examples of the use of sodium polysulfide as an inhibitor against polymer formation in 2-methyl-5-vinylpyridine are illustrative of my invention, but are in no sense limitative thereof. All of the tests were conducted in a similar manner. To a mixture of 2-methyl-5-ethylpyridine and 2-methyl-5-vinylpyridine, the latter in a larger proportion, which would grow popcorn polymer rapidly, was added a seed of active popcorn polymer of 2-methyl-5-vinylpyridine. This constituted a control sample. To a portion of the control sample was added varying quantities of sodium polysulfide, based on the weight of the mixed pyridines, and the solutions were maintained at 190° F. for the indicated time intervals.

Example I

| Sample Description | Time | Observations |
|---|---|---|
| (1) Control | 16 hours | 100% popcorn polymer. |
| (2) Control plus 0.15 wt. percent sodium polysulfide. | 5 days | Fluid, no popcorn growth. |
| (3) Control | 20 hours / 48 hours | 75% popcorn polymer. / 100% popcorn polymer. |
| (4) Control plus 0.6 wt. percent sodium polysulfide. | 5 days | Fluid, no popcorn polymer. |

Example II

| Sample Description | Time | Observations |
|---|---|---|
| (1) Control | 11 hours / 16 hours | 50% popcorn polymer. / 100% popcorn polymer. |
| (2) Control plus 0.4 wt. percent sodium polysulfide. | 5 days / 12 days | Fluid, no popcorn polymer. / Less fluid, but no popcorn polymer. |

Example III

| Sample Description | Time, hours | Observations |
|---|---|---|
| (1) Control | 8 | almost solid due to soluble polymer and popcorn polymer. |
| | 13 | solid popcorn polymer. |
| (2) Control plus 0.08 wt. percent sodium polysulfide. | 40 | very fluid, with a trace of popcorn polymer. |
| | 64 | all popcorn polymer. |
| (3) Control plus 0.15 wt. percent sodium polysulfide. | 88 | fluid, no popcorn polymer. |
| (4) Control plus 0.30 wt. percent sodium polysulfide. | 88 | very fluid, with a trace of popcorn polymer. |
| (5) Control plus 0.45 wt. percent sodium polysulfide. | 88 | very fluid, no popcorn polymer. |
| (6) Control plus 2.0 wt. percent ethylene glycol. | 8 | very viscous, popcorn polymer growing. |
| | 20 | solid popcorn polymer. |
| (7) Control plus 2.0 wt. percent ethylene glycol plus 0.15 wt. percent sodium polysulfide. | 88 | very fluid, no popcorn polymer. |
| (8) Control plus 2.0 wt. percent methyl carbitol. | 8 | very viscous, popcorn polymer growing. |
| | 20 | solid popcorn polymer. |
| (9) Control plus 2.0 wt. percent methyl carbitol plus 0.15 wt. percent sodium polysulfide. | 88 | very fluid, no popcorn polymer. |

In carrying out my invention the polysulfide can be used in either a water solution or dissolved in an organic compound which is a mutual solvent for the polysulfide and the vinylpyridine compounds desired to be stabilized. If a water solution of the polysulfide is used, it will be found that, when this water solution is injected into a fractionating column, the polysulfide will precipitate gradually and periodically a water wash of the column plus a drying tower on the fractionating column overhead will be required. However, use of a mutual solvent for the polysulfide and the vinylpyridine compounds obviates these problems and, generally, the polyhydric alcohols will be satisfactory for this purpose. Reference is also made to glycol ethers, alkyl glycol ethers and glycerol compounds and such specific compounds as ethylene glycol, propylene glycol, alpha butylene glycol, beta butylene glycol, tetra methylene glycol, 1,5-pentanediol, pinacol, glycerol, Carbitol, methyl Carbitol and butyl Carbitol.

Such mutual solvents can be used in the range of from 1 to 25 per cent by weight based on the weight of the vinylpyridine compound to be stabilized. The preferred amount depends on the amount of polysulfide desired to be used, sufficient mutual solvent being utilized to dissolve the polysulfide under the conditions then existing. Where the polysulfide is used in the range of from .01 to .5 per cent by weight, a preferred range of concentration of such mutual solvent is from 1 to 5 per cent by weight.

As is apparent from the above examples, the quantity of polysulfide used to inhibit polymer formation can be varied within wide limits, the practical limitations being from 0.01 weight per cent to 5.0 weight per cent based on the weight of the vinylpyridine compounds to be stabilized. Where soluble polymer formation is desired to be inhibited as well as popcorn polymer formation a greater amount of polysulfide is required. Since polymer formation is more rapid as operating conditions of temperature and pressure increase in severity a greater amount of polysulfide is required when a distillation process is concerned than when storage only of the vinylpyridine compounds is desired. A preferred commercially feasible range of concentration of polysulfide to inhibit popcorn polymer formation in the distillation of vinylpyridine compounds is from 0.2 weight per cent to 2.0 weight per cent and, if soluble polymer formation also is desired to be inhibited, up to 5.0 weight per cent polysulfide can be used. A preferred range of concentration of polysulfide to inhibit both soluble and popcorn polymer formation, when only the storage of vinylpyridine compounds is concerned, is from 0.05 weight per cent to 1.0 weight per cent.

The above examples illustrate the effectiveness of the alkali-metal polysulfides as inhibitors for polymer formation in vinyl-substituted heterocyclic compounds containing a hetero nitrogen atom. Other modes of applying the principle of this invention can be employed within the scope of this invention, instead of those explained, changes being made with regard to the method or compounds disclosed, provided the steps or compounds stated or the equivalents of such steps or compounds be employed.

I claim:

1. A method of stabilizing heterocyclic nitrogen bases selected from the group consisting of compounds having the formua

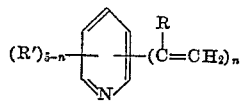

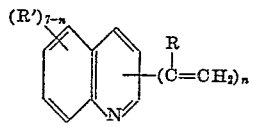 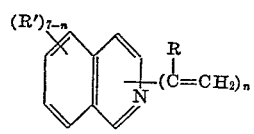

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, with a stabilizing amount of an alkali-metal polysulfide having from 2 to 5 sulfur atoms.

2. The method of claim 1 wherein the heterocyclic nitrogen bases are stabilized with from about 0.01 to about 5.0 weight per cent, based on said heterocyclic nitrogen basis, of an alkali-metal polysulfide having from 2 to 5 sulfur atoms, selected from the group consisting of sodium polysulfide and potassium polysulfide.

3. A method which comprises stabilizing a heterocyclic nitrogen base selected from the group consisting of compounds having the formula

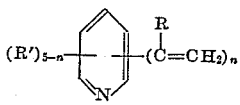

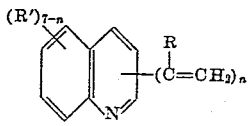 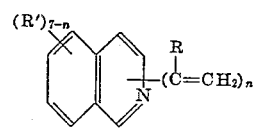

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, with a stabilizing amount of an alkali-metal polysulfide having from 2-5 sulfur atoms, the heterocyclic nitrogen base and alkali-metal polysulfide being dissolved in a mutual organic solvent selected from the group consisting of polyhydric alcohols, glycol ethers, alkyl glycol ethers and glyceryl compounds.

4. The method of claim 1 wherein the heterocyclic nitrogen base is stabilized with from about 0.01 to about 5.0 weight per cent, based on said heterocyclic base, of an alkali-metal polysulfide having from 2 to 5 sulfur atoms, selected from the group consisting of sodium polysulfide and potassium polysulfide.

5. A method which comprises adding to a mixture of heterocyclic nitrogen bases selected from the group consisting of compounds having the formula

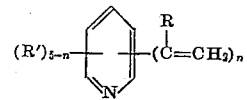

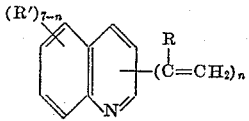 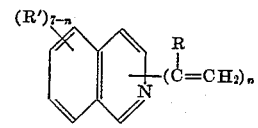

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, and containing a substantial portion of lower alkyl-substituted vinyl pyridines, a stabilizing amount of an alkali-metal polysulfide having from 2 to 5 sulfur atoms selected from the group consisting of sodium polysulfide and potassium polysulfide.

6. A polymerizable heterocyclic nitrogen base selected from the group consisting of compounds having the general formula

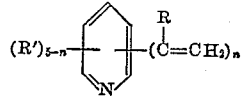

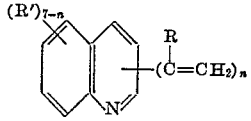 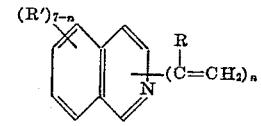

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, said heterocyclic nitrogen base being stabilized by the addition of a stabilizing amount of an alkali-metal polysulfide having from 2 to 5 sulfur atoms.

7. According to claim 6, wherein the alkali-metal polysulfide is from about 0.01 to 5.0 weight per cent, based on the said heterocyclic nitrogen base.

8. A continuous process for inhibiting the formation of vinylpyridine polymers in water condensed effluent gases from the catalytic dehydrogenation of 2-methyl-5-ethylpyridine to produce 2-methyl-5-vinylpyridine which comprises introducing into said condensing water a sufficient quantity of a compound selected from the group consisting of sodium polysulfide and potassium polysulfide to inhibit polymerization.

9. A process for inhibiting the polymerization of 2-methyl-5-vinylpyridine during distillation which comprises adding to said 2-methyl-5-vinylpyridine an amount sufficient to effect said inhibition of an alkali metal polysulfide having from 2 to 5 sulfur atoms in aqueous solution.

10. A process for inhibiting the polymerization of 2-methyl-5-vinylpyridine during distillation which comprises adding to said 2-methyl-5-vinylpyridine from 0.01 to 5.0 per cent by weight based on said 2-methyl-5-vinylpyridine of sodium polysulfide in aqueous solution.

11. A process for inhibiting the formation of popcorn polymers in 2-methyl-5-vinylpyridine during distillation which comprises adding to said 2-methyl-5-vinylpyridine from 0.2 to 2.0 per cent by weight based on said 2-methyl-5-vinylpyridine of sodium polysulfide in aqueous solution.

12. A process for inhibiting the formation of soluble polymers in 2-methyl-5-vinylpyridine during distillation which comprises adding to said 2-methyl-5-vinylpyridine from 2.0 to 5.0 per cent by weight based on said 2-methyl-5-vinylpyridine of sodium polysulfide in aqueous solution.

References Cited in the file of this patent

UNITED STATES PATENTS

| | | |
|---|---|---|
| 2,166,125 | Britton et al. | July 18, 1939 |
| 2,512,660 | Mahan | June 27, 1950 |
| 2,556,845 | Kauffman | June 12, 1951 |
| 2,592,625 | Wagner | Apr. 15, 1952 |

OTHER REFERENCES

Handbook of Chem. and Physics (30th ed.) pp. 472 and 496 (1947).

Frank et al.: JACS, vol. 68, p. 908 (1946).

Dunbrook: Chem. Abst., vol. 42, cols. 8011–12 (1948).